Patented Jan. 6, 1948

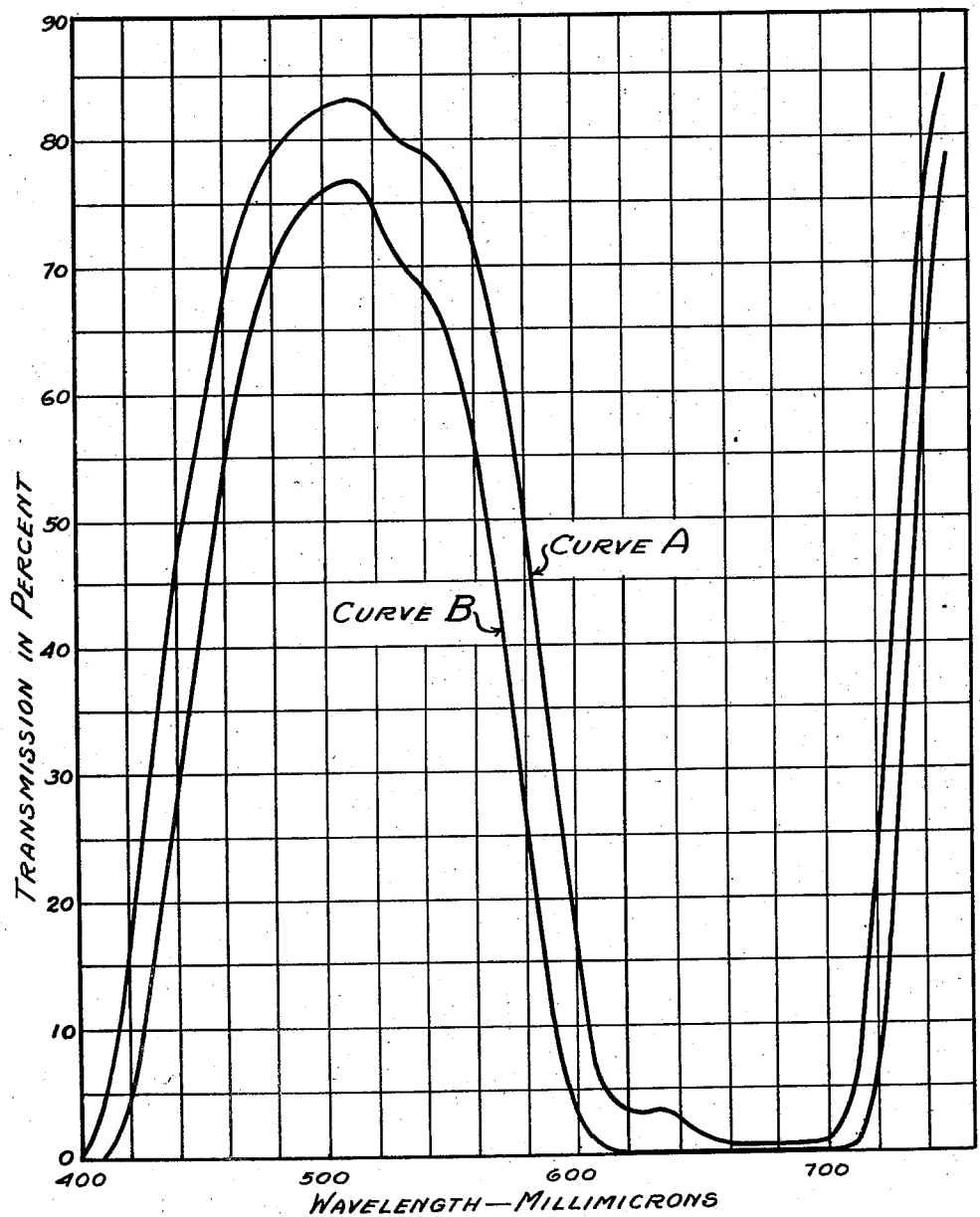

2,433,882

UNITED STATES PATENT OFFICE 2,433,882

COLORED GLASS

William H. Armistead, Corning, N. Y., assignor to Corning Glass Works, Corning, N. Y., a corporation of New York Application June 24, 1946, Serial No. 678,767

8 Claims. (Cl. 106—54)

This invention relates to glass compositions and is a continuation in part of my pending application Serial Number 558,549, filed October 13, 1944, now Patent No. 2,409,412 of October 15, 1946, in which are disclosed glasses containing halides of iron and colored yellow thereby. It is shown that such glasses are high alumina borosilicates containing at least 10% $Al_2O_3$, at least .4% of a halide (chloride, bromide or iodide), .02% to .5% $Fe_2O_3$, and having a ratio of alumina to alkali metal oxides which is greater than one. It is further shown that such glasses have a strong absorption and a sharp cutoff for blue and violet light.

The primary object of this invention is to provide glasses which have a similar sharp cutoff for blue and violet light together with a sharp cutoff and absorption for red light.

Another object is to provide glasses which transmit only green light.

A further object is to provide glasses which are colored green by a halide of iron combined with a halide of cobalt.

I have now found that the above and other objects may be attained by introducing cobalt oxide into the prior glasses. I have found that the purity of color and the sharp cutoff of the new glasses depend largely upon the halide content of the finished glass, being suitable for my purpose when the halide content is at least .5% and preferably .7% or more of analytically determined halogen. As is well known the halides, when introduced into glass, are volatilized to such an extent during melting that only very small amounts, if any, are retained in the glass. I have found that the presence of at least 10% $Al_2O_3$ causes retention of .5% or more of the halide in borosilicate glasses. For obtaining the maximum coloration of the iron, it is essential that the alumina to alkali metal oxide ratio be greater than one. While the minimum effective amount of alumina is about 10%, the maximum amount is limited only by the increasing hardness and ultimate unmeltability of the glass.

Briefly, the new glasses consist essentially of silica, boric oxide, alkali metal oxide ($R_2O$), at least 10% $Al_2O_3$, up to 2.5% of oxides of iron and cobalt and at least .5% of a halide (chloride, bromide or iodide) as determined by analysis.

The halides are introduced into the glass preferably as the halides or halogen compounds of the alkali metals. On account of the large volatilization losses, the percentage of halide which remains in the finished glass will be less than the amount which was introduced into the batch. It is, therefore, necessary to introduce an excess of the halide into the batch in order to obtain a sufficient amount in the finished glass.

Chloride produces a sharper cutoff than bromide and the latter is better than iodide. Fluoride, however, has no direct effect in improving the cutoff of the glass but seems to improve the retention of chloride when the latter is present. Since fluoride also has a softening effect upon the glass, its presence with the chloride is advantageous for some purposes such as improving the meltability of the glass without unduly raising its expansion coefficient.

Glasses, in which the alkali metal oxide is soda alone, retain somewhat more halide than potash glasses but potash produces a slightly brighter color than soda. Lithia is not so good as either soda or potash, but can be employed. Since the alkali metal oxide content of the glass should not exceed the alumina content, as pointed out above, the maximum percentage of alkali metal oxides is limited by the meltability of the glass which becomes harder and harder as the alumina content is increased.

The total percentage of iron and cobalt oxides should preferably not exceed about .6% although for some purposes, such as the production of strong coloration in thin sections of glass, the use of larger percentages may be desirable. The iron content may be between .02% and .5% $Fe_2O_3$ and the cobalt content between .02% and 2% $Co_2O_3$. For present purposes the use of reducing agents in the batch should be avoided because ferrous halide produces very little coloration in glass and only the blue color of cobalt halide would thereby be obtained. The production of blue glasses containing cobalt chloride is disclosed in my pending application Serial No. 621,853, filed October 11, 1945.

Divalent oxides, such as the oxides of metals of the second periodic group, lead, etc., even in small amounts, have an objectionable effect and prevent the development of the desired coloration in the new glasses. Consequently, these oxides must be substantially absent from the glass.

Melting the glass in closed pots also facilitates the retention of halide in the glass and hence is a further aid in producing the desired coloration.

The following compositions show by way of example but not as limitations glasses according to my invention. The compositions were calculated from their respective batches into approximate weight percent on the oxide basis. The compositions contain chloride as the halide and its analytical content for each glass is shown. Bromide or iodide can be substituted for the chloride with at least some of the benefits of the invention.

|  | A | B | C | D | E | F | G |
|---|---|---|---|---|---|---|---|
| $SiO_2$ | 45 | 45 | 45 | 57 | 30 | 42 | 45 |
| $B_2O_3$ | 20 | 20 | 20 | 25 | 35 | 20 | 15 |
| $Al_2O_3$ | 20 | 20 | 20 | 10 | 20 | 20 | 21 |
| $K_2O$ | 10 | 10 | 10 |  | 15 | 15 | 16 |
| $Na_2O$ | 5 | 5 | 5 | 8 |  | 3 | 3 |
| $Co_2O_3$ | 0.05 | 0.1 | 0.3 | 0.1 | 0.02 | 0.2 | 0.05 |
| $Fe_2O_3$ | 0.05 | 0.1 | 0.3 | 0.05 | 0.02 | 0.1 | 0.1 |
| Per cent Cl by analysis | 1.4 | 1.4 | 1.4 | .79 | .63 | .93 | .74 |
| Per cent $R_2O$ added as halide | 5 | 5 | 5 | 4 | 4 | 5 | 3 |
| Per cent $Na_2O$ added as $Na_2SiF_6$ | 5 | 5 | 5 |  |  | 3 | 3 |

All of the compositions except D and E contain fluorine which may be determined by analysis. It will be noted that the percentage of alumina exceeds the percentage of alkali metal oxide and that the analytical chlorine content is high. On account of the high chlorine content, the color of the glasses is green. Various hues of blue green and yellow green may be obtained by increasing and decreasing the cobalt content relative to the iron content.

The valuable spectral characteristics of the new glasses are illustrated in the accompanying drawing which is a graph showing curves representing transmission in percent plotted against wave lengths of visible light. Curve A represents the transmission characteristics of glass A in the above table and curve B represents the transmission of glass B, both being in a thickness of about 5 mm. It will be noted that the maximum transmission is in the neighborhood of 510 millimicrons and that the transmission decreases very sharply toward the red and the blue, very little of which is transmitted. Prior so-called green glasses transmit a substantial amount of either blue light or yellow light wherefore they are either blue-green or yellow-green.

I claim:

1. A colored glass which consists essentially of silica, boric oxide, alkali metal oxide, not less than 10% $Al_2O_3$, not more than about 2% $Co_2O_3$ and .02% to .5% $Fe_2O_3$ and which contains by analysis at least .5% of a halogen having an atomic weight between 35 and 127, the ratio of alumina to alkali metal oxides being greater than one.

2. A colored glass which consists essentially of silica, boric oxide, alkali metal oxide, not less than 10% $Al_2O_3$, not more than about 2% $Co_2O_3$ and .02% to .5% $Fe_2O_3$ and which contains by analysis at least .5% of chlorine, the ratio of alumina to alkali metal oxides being greater than one.

3. A colored glass which consists essentially of silica, boric oxide, alkali metal oxide, not less than 10% $Al_2O_3$, not more than about 2% $Co_2O_3$ and .02% to .5% $Fe_2O_3$ and which contains by analysis at least .7% of chlorine, the ratio of alumina to alkali metal oxides being greater than one.

4. A colored glass which consists essentially of silica, boric oxide, alkali metal oxide, not less than 10% $Al_2O_3$, .02% to .3% $Co_2O_3$ and .02% to .3% $Fe_2O_3$, and which contains by analysis at least .5% of a halogen having an atomic weight between 35 and 127, the ratio of alumina to alkali metal oxides being greater than one.

5. A colored glass which consists essentially of silica, boric oxide, alkali metal oxide, not less than 10% $Al_2O_3$, .02% to .3% $Co_2O_3$, and .02% to .3% $Fe_2O_3$, and which contains by analysis at least .5% of chlorine, the ratio of alumina to alkali metal oxides being greater than one.

6. A colored glass which consists essentially of silica, boric oxide, alkali metal oxide, not less than 10% $Al_2O_3$, not more than about 2% $Co_2O_3$ and .02% to .5% $Fe_2O_3$, and which contains fluorine and at least .5% of chlorine by analysis, the ratio of alumina to alkali metal oxide being greater than one.

7. A colored glass which consists essentially of silica, boric oxide, alkali metal oxide, not less than 10% $Al_2O_3$, .02% to .3% $Co_2O_3$ and .02% to .3% $Fe_2O_3$, and which contains fluorine and at least .5% of chlorine by analysis, the ratio of alumina to alkali metal oxides being greater than one.

8. A colored glass which consists approximately of 45% $SiO_2$, 20% $B_2O_3$, 20% $Al_2O_3$, 10% $K_2O$, 5% $Na_2O$, .1% $Co_2O_3$, .1% $Fe_2O_3$, at least .5% Cl by analysis and fluorine.

WILLIAM H. ARMISTEAD.